June 26, 1928.

C. C. FARMER 1,674,769

DUMMY COUPLING

Filed Aug. 27, 1926

INVENTOR
CLYDE C. FARMER
BY Wm. M. Cady
ATTORNEY

Patented June 26, 1928.

1,674,769

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

DUMMY COUPLING.

Application filed August 27, 1926. Serial No. 131,925.

This invention relates to hose couplings as employed on railway cars for coupling up the ends of the flexible train pipe hose between cars, and more particularly to a dummy coupling for closing communication through a hose coupling, when not connected to a corresponding coupling.

It has heretofore been proposed to provide a dummy coupling adapted to interlock with a hose coupling and having an annular projecting portion cast integral with the dummy coupling and adapted to engage in the opening through the gasket of the hose coupling, when the dummy coupling is applied thereto.

A gasket seat is provided around said projecting portion on which the gasket engages, in order to prevent leakage.

With the above type of dummy coupling, the gasket seat often becomes rusted and pitted, which tends to prevent the making of a tight seat, thus permitting leakage. The gasket seat is also exposed to dirt and moisture when the dummy coupling is connected to a hose coupling.

The principal object of my invention is to provide an improved dummy coupling in which the above difficulties are obviated.

Figure 1:
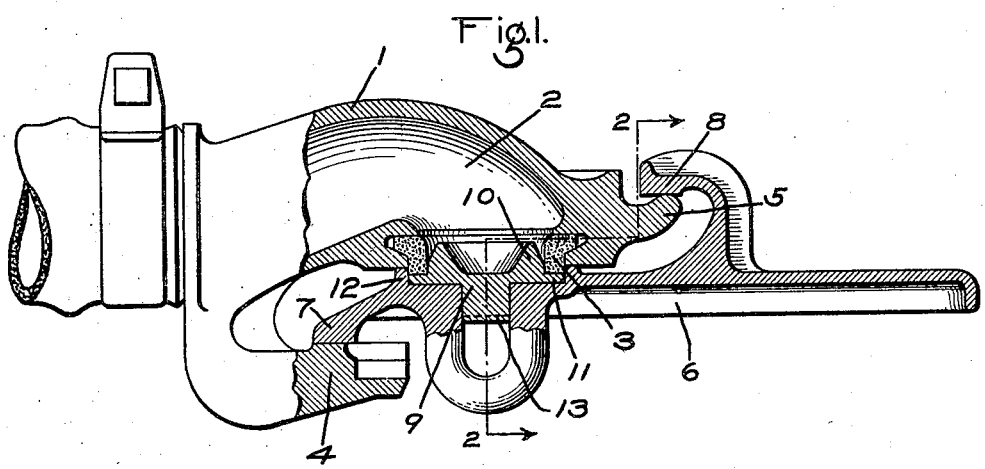

In the accompanying drawing; Fig. 1 is a sectional view of a hose coupling with my improved dummy coupling applied thereto; and Fig. 2 a section on the line 2—2 of Fig. 1.

In Fig. 1, the reference numeral 1 indicates a hose coupling head of the usual type having a fluid conduit 2 and a flexible gasket 3 disposed in an annular groove at the meeting face of the coupling and having the usual locking flanges 4 and 5, adapted to interlock with similar flanges of a counterpart coupling head.

The dummy coupling 6, shown applied to the hose coupling 1, is provided with locking flanges 7 and 8 adapted to interlock with the flanges 4 and 5 of the coupling head 1. Adapted to aline with the gasket 3 is an annular recess for receiving an insert 9, of non-rusting metal, preferably brass. Said insert is provided with an upwardly extending annular portion 10 adapted to engage in the opening through the gasket 3 and with an annular flange 11, which fits in the annular recess in the dummy coupling, said recess being of greater depth than the thickness of the flange, so as to provide an annular portion 12 on the dummy coupling for engaging the hose coupling.

The insert 9 is provided with a downwardly extending teat 13 adapted to be pressed into a bore in the dummy coupling, disposed centrally of the insert holding recess.

Figure 2:
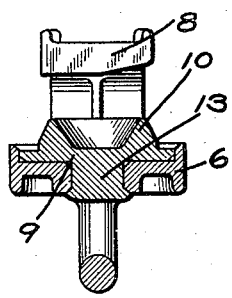

In order to more securely hold the insert in place, the end portion of the teat may be peened into recesses provided in the dummy coupling at opposite sides of the teat, as shown in Fig. 2.

When the dummy coupling is applied to a hose coupling, the flange 12 engages the adjacent face of the hose coupling and thus prevents the entrance of dirt and moisture. The flange 12 also serves to hold the gasket 3 in place and prevent the same from spreading, and the insert being of brass or other non-rusting material, the seat for the gasket, provided thereon, is prevented from rusting and from becoming pitted, so that a leak tight joint can be maintained.

Having now described my invention, what I claim as new and desire to secure by Letters Patent, is:

1. A dummy coupling provided with a non-ferrous metal insert having a central annular projecting portion and an annular gasket seating flange concentric with said projecting portion, said flange being positioned in an annular recess in the dummy coupling, and the annular wall of said recess extending above the seat face of the insert.

2. A dummy coupling having an annular wall forming a recess, a brass insert having an annular flange positioned in said recess and provided with a gasket seat, said annular wall extending above the gasket seat.

3. The combination with a hose coupling provided with a gasket having an outwardly extending annular seat portion, of a dummy coupling adapted to be connected to said hose coupling and provided with a metal insert having an annular central portion adapted to extend into the annular opening of the gasket and a gasket seat portion surrounding said central portion, the dummy coupling being provided with an annular flange surrounding said seat portion and extending above the seat portion of the insert, to provide a recess for receiving the annular seat portion of the hose coupling gasket.

In testimony whereof I have hereunto set my hand.

CLYDE C. FARMER.